SERVO AMPLIFIER SYSTEM

Filed Nov. 28, 1956 2 Sheets-Sheet 1

INVENTORS
CLYDE J. NORTON,
DONALD F. DIMON,
By Perry E. Turner
AGENT.

SERVO AMPLIFIER SYSTEM

Filed Nov. 28, 1956 2 Sheets-Sheet 2

INVENTORS.
CLYDE J. NORTON,
DONALD F. DIMON
BY Perry E. Turner
AGENT.

2,945,996

SERVO AMPLIFIER SYSTEM

Clyde J. Norton, Sepulveda, Calif., and Donald F. Dimon, Las Vegas, Nev., assignors to Lear, Incorporated, Santa Monica, Calif.

Filed Nov. 28, 1956, Ser. No. 624,786

8 Claims. (Cl. 318—28)

This invention relates to amplifier systems, and more particularly to an improved servo amplifier control system suitable for use in aircraft.

In many applications where space and weight are at a premium, e.g., in aircraft, servo amplifier systems to control the operation or positioning of a device are characterized by undue size and weight. The space requirements of such amplifiers are dictated primarily by the size of components employed and the complex arrangement of circuits needed to render the system highly accurate. Such complexity in turn adds materially to the weight and cost of a system, and it further increases maintenance problems.

It is an object of this invention to provide an improved servo amplifier system which is considerably smaller in size and lighter in weight than prior art servo systems, and yet is highly accurate and more dependable than such prior art systems.

It is a further object of this invention to provide a servo amplifier system having unique circuit arrangements, which will operate from the low voltage D.-C. power supply in an aircraft, which does not require vibrators and high voltages as do prior art systems of this type, and which is more dependable than prior art servo systems.

Figures 2A, 2B, 2C:
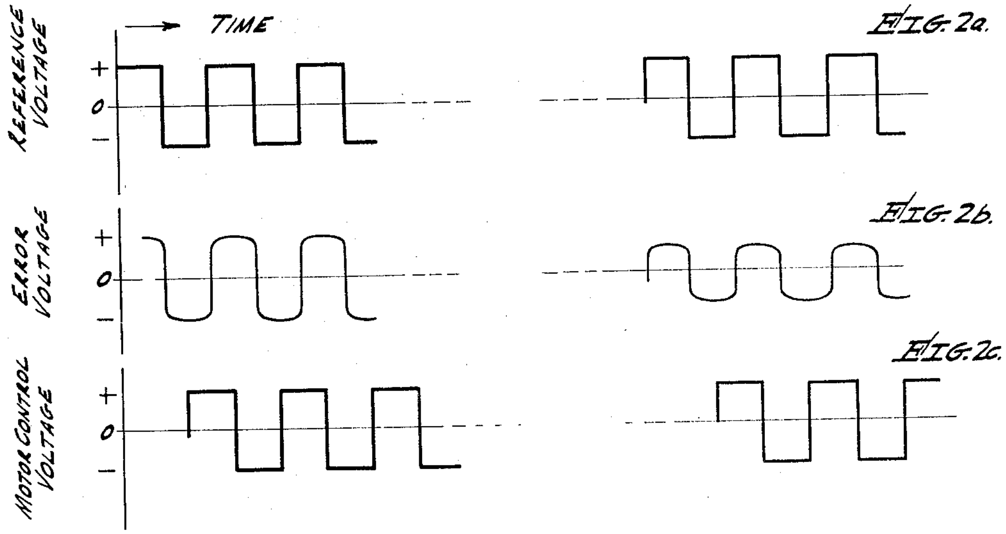
Figure 4:
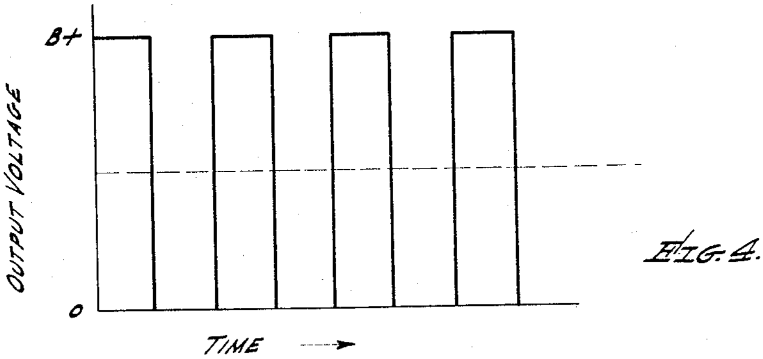
Figure 3:
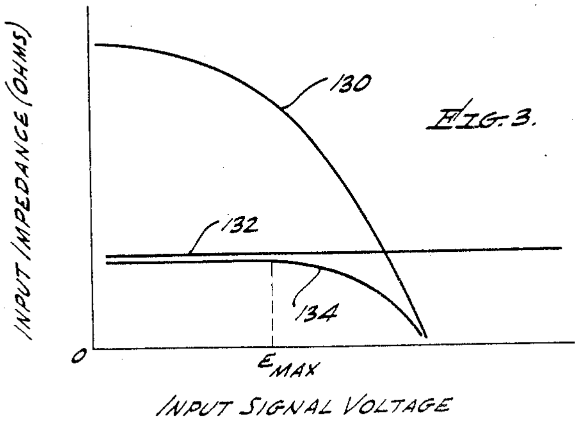

The above and other objects and advantages of this invention will be apparent from the following description, taken in conjunction with the accompanying drawings, in which a preferred embodiment of the invention is illustrated by way of example. The scope of the invention is pointed out in the appended claims. In the drawings, Fig. 1 is a schematic diagram of an improved servo amplifier system, in accordance with this invention, Figs. 2*a*, 2*b* and 2*c* illustrate wave forms to aid in explaining and understanding the operation of the system of Fig. 1, Fig. 3 illustrates a curve to aid in explaining the operation of certain component parts of the system of Fig. 1, and Fig. 4 is a curve illustrating the output voltage of the system of Fig. 1.

Briefly, a servo amplifier system in accordance with this invention comprises a push-pull transistor amplifier input stage having a single-ended input to receive cyclical input signals representing the off-null position of an ADF loop antenna, a push-pull transistor amplifier driver stage, and a transistor switch output stage. The amplifiers also function to limit the magnitude of output signals therefrom to a substantially constant level, and the output stage develops a square wave output voltage of constant magnitude which varies between fixed limits. An antenna drive motor coupled to the output stage is driven at constant speed, in a direction depending upon the phase of the output square wave relative to a reference square wave, until the loop antenna reaches a null position and the square wave input signals reduce to zero. Novel features of the individual circuits will be explained in the following description.

Figure 1:
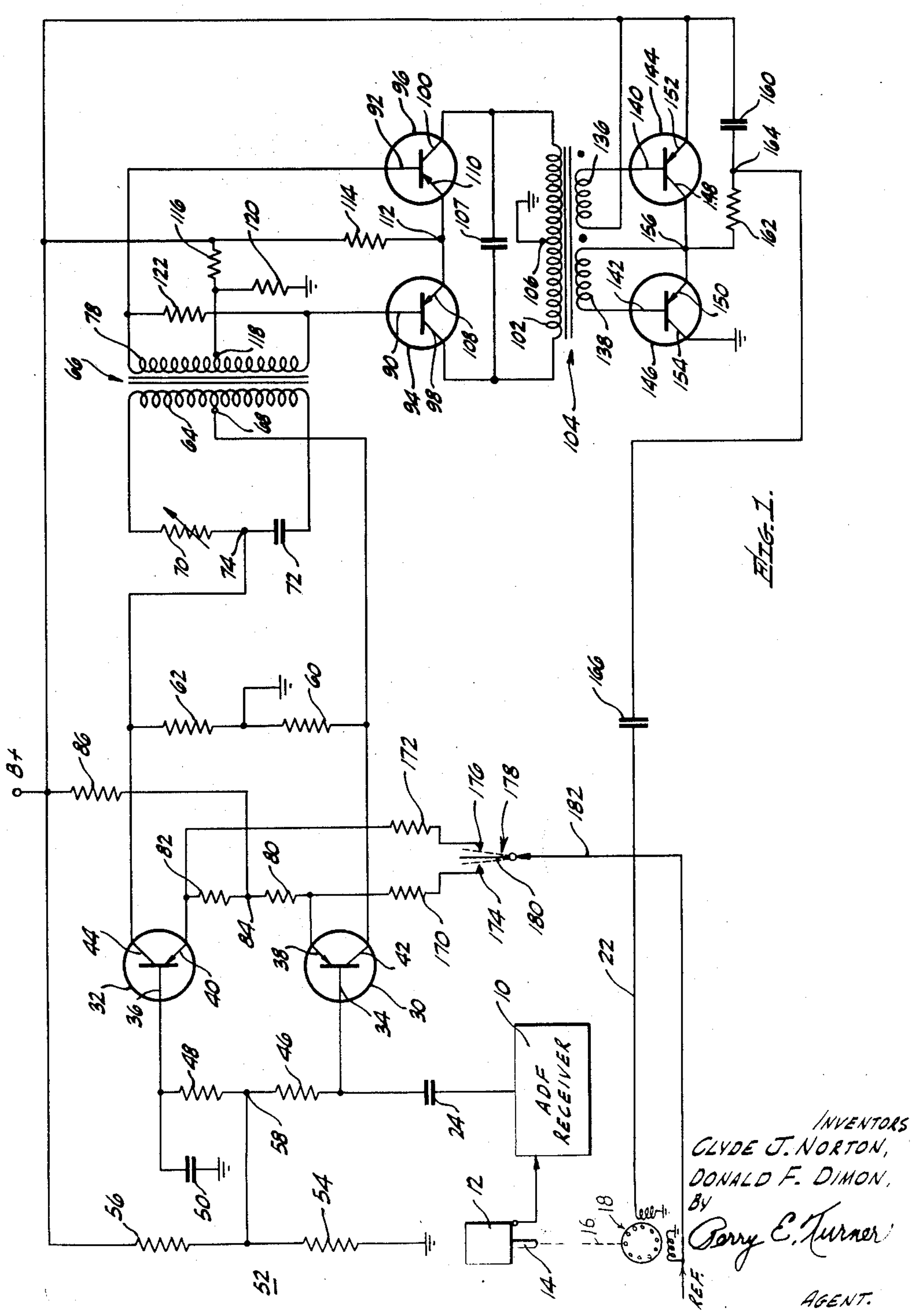

Referring to Fig. 1, an ADF (automatic direction finder) receiver 10 is shown with its loop antenna 12 connected to its input, such antenna being mounted in a conventional manner for rotation on a shaft 14. Shaft 14 is mechanically coupled to the output shaft 16 of a motor 18, which may be a two-phase motor having conventional reference and control windings (not shown).

For the purpose of this invention, receiver 10 is adapted to develop cyclical error signals of a desired fixed frequency and of a magnitude representing the position of the loop antenna 12. In a conventional manner, such signals will be zero when the plane of the antenna is perpendicular to the signals from a desired station which transmits signals for ADF purposes; this is the null position of the antenna. Preferably, the error signals are square waves; however, it will be apparent that the invention will operate satisfactorily in response to error signals of different wave shape, e.g., sinusoidal. When the antenna is off null, the magnitude of the error signals represents the angular position of the plane of the antenna relative to the null; the error signals for positions of the antenna clockwise from the null will differ by 180° from the error signals for positions of the antenna counter-clockwise from the null.

A square wave reference voltage (Fig. 2*a*) of fixed frequency is applied to the reference winding of motor 18, through an input lead 20. A control voltage (Fig. 2*c*) of the same frequency is applied to the motor control winding, through an input lead 22, to drive the motor, and hence the antenna, in a direction to move the antenna to null position. The control voltage is a substantially true square wave, and is of constant magnitude. The means for controlling the operation of motor 18, which is the subject of this invention, will now be explained.

The error signals from receiver 10 shown in Fig. 2*b* as approximating square waves, are applied through a capacitor 24 to the input stage of the servo amplifier of this invention. Such input stage comprises a pair of P-N-P power amplification junction transistors 30, 32 having respective bases or base electrodes 34, 36, emitters or emitter electrodes 38, 40, and collectors or collector electrodes 42, 44. The bases 34, 36 are connected through a pair of resistors 46, 48, and capacitor 24 is connected directly to the base 34. An A.-C. bypass capacitor 50 is connected between base 36 and ground.

A voltage divider network 52, connected between the positive terminal B+ of a D.-C. voltage source and ground, comprises a pair of resistors 54, 56, the junction of which is connected to the junction 58 of resistors 46, 48. This arrangement permits the base voltages to be set at the same level.

Respective load resistors 60, 62 are connected to the collectors 42, 44 and to ground, as shown. The primary winding 64 of an output transformer 66 is provided with a center-tap 68 connected to the collector 42 of transistor 30. A variable resistor 70 and a capacitor 72 are connected in series across primary winding 64, and the junction 74 of such resistor and capacitor is connected to the collector 44 of transistor 32. This circuit arrangement will be recognized as one in which voltages appearing across the respective load resistors 60, 62 also appear between center-tap 68 and junction 74. In a well-known manner, an A.-C. generator may be considered as located between center-tap 68 and junction 74, whereby the lower half of primary winding 64 and capacitor 72 are in parallel with the upper half of the primary and variable resistor 70, relative to center-tap 68 and junction 74. Thus, where voltages of the same magnitude and sign appear between each load resistor 60, 62 and ground, the net voltage between center-tap 68 and junction 74 is zero. If there is a net voltage, however, currents flow through the two branches; the current in the branch which includes variable resistor 70 is in phase with the impressed voltage, and the current in the branch which includes capacitor 72 leads the impressed voltage. This results in a net or resultant voltage across primary winding 64 which is transferred to the secondary winding 78.

Connected between the emitters 38, 40, is a pair of resistors 80, 82, and the junction 84 of these emitter resistors is connected through a dropping resistor 86 to B+. The resistances of dropping resistor 86 and emitter resistors 80, 82 are such that the D.-C. potentials of the emitters are substantially the same as the D.-C. potentials of the bases 34, 36. Preferably, however, in order to utilize the action of the transistors most effectively, it is made certain that the emitter D.-C. potentials are slightly more positive than the base D.-C. potentials, e.g. 0.1 volt. Thus, emitter-to-collector current flows through each transistor in the absence of input signals. These currents are obviously equal, however, and since they flow through the load resistors 60, 62 in opposite directions, the net voltage across the load resistors, and hence between center-tap 68 and junction 74, is zero. In addition, the sum of these currents, which is effectively determined by dropping resistor 86, is substantially the total of the collector currents which flow in either or both transistors in the presence of input signals. This will be made more evident hereinafter in the description of operation of the circuit.

In the circuit above described, the resistances of base resistors 46, 48 are equal, as are the resistances of emitter resistors 80, 82. The base resistances are relatively large compared to such emitter resistors. Dropping resistor 86 has a still greater resistance, so as to be hundreds of times greater than the emitter impedance, i.e., the impedance represented by current change effected by change of voltage at the emitter with respect to the base, which may be of the order of four or five ohms. In a typical example, base resistors 46, 48 of 4,700 ohms each, emitter resistors 80, 82 of 470 ohms each, and dropping resistor 86 of 6,700 ohms were used in a circuit supplied from a 28-volt aircraft battery.

Signals from receiver 10 are applied through capacitor 24 to the base 34 of transistor 30, and capacitor 24 functions to prevent the D.-C. level of the bases 34, 36 from being affected by the D.-C. level of the error signals in the output of receiver 10. Application of these error signals to base 34 causes the potential of base 34 to vary about its D.-C. level an amount corresponding to the magnitude of such error signals. The potential of the other base 36, however, will remain at its D.-C. level, because the cyclical input signal will be passed to ground by the A.-C. bypass capacitor 50. Thus, the circuit above described utilizes a single-ended input.

When signals are applied from receiver 10, the voltage at emitter 38 will follow changes in the associated base voltage, in a manner conventional in transistor operation. However, due to the inherent characteristics of transistors, the voltage change at emitter 38 will not be as great as the voltage change on base 34; the magnitude of the emitter voltage change is less than the base voltage change because of the internal impedance representing the combined effects of the "holes" and electrons, i.e., the charge carriers, in the transistor. Any voltage change appearing at emitter 38, however, will also appear at the junction 84 of resistors 80, 82, and the emitter 40 of the other transistor 32.

Assume the positive half of an input square wave (Fig. 2b) is applied to base 34 of transistor 30. The increase in this base voltage will be followed by a smaller increase in both emitter voltages. If the magnitude of the square wave is sufficiently large to make the base 34 positive with respect to emitter 38, emitter-to-collector current flow through transistor 30 will be blocked. However, since the potential of emitter 40 increases by the same amount as the potential of emitter 38, and since the potential of base 36 remains at its D.-C. level, for the reason previously explained, emitter 40 is thus made more positive than base 36, whereby emitter-to-collector current flows through transistor 32. (The electrode potentials here mentioned are referenced to ground.) On the negative half cycle, the potential of base 34 is lowered, whereby the emitter potentials also decrease, but by a lesser amount; thus, since base 36 remains at the same potential, base 36 is more positive than emitter 40 and base 34 is less positive than emitter 38, whereby emitter-to-collector current flows only through transistor 30. Thus, it will be seen that this circuit arrangement provides for push-pull operation of the transistors from a single-ended input, and the alternating voltages appearing between center-tap 68 and junction 74 are transferred to the secondary winding 78 of transformer 66.

Again assuming the positive half cycle of the square wave error signal is applied to base 34 of transistor 30, the magnitude thereof may be so small, as where antenna 12 is very nearly at the null position, that the potential of emitter 38 is still slightly positive with respect to base 34. In this situation, since the potential of emitters 38 and 40 follow the positive change of the associated base potential, emitter-to-collector current flows through both transistors, increasing in one and decreasing in the other in conventional push-pull fashion. The current flow through transistor 32 will of course be greater than that through transistor 30, whereby an amplified net voltage of one polarity will appear between center-tap 68 and junction 74, and a corresponding output voltage appears across the secondary winding 78 of transformer 66. An amplified net voltage of opposite polarity is developed during the reverse operation which takes place on the negative half cycle. In this case, of course, the output voltage appearing across secondary winding 78 is of smaller amplitude than where only one transistor is conducting.

In the operations above described, the large unbypassed dropping resistor 86 functions to permit maximum current gain for low amplitude signals when both transistors are conducting, and to limit the gain at high amplitude signal inputs when only one conducts. This is due to the fact that the emitter impedances of the transistors while conducting are of the order of only a few ohms, and thus much smaller than that of resistor 86, whereby each transistor effectively shunts the other; when only one transistor is conducting, however, the non-conducting one is effectively an infinite impedance, so that resistor 86 is in circuit with and limits the gain of the conducting transistor. For signal inputs greater than that necessary to cut off one transistor, this results in clipping to maintain the output voltage at substantially the same magnitude.

The secondary winding 78 is connected at its ends to the base electrodes 90, 92 of respective P-N-P power amplification junction transistors 94, 96. The respective collector electrodes 98, 100 of transistors 94, 96 are connected to the end terminals of the primary winding 102 of an output transformer 104. Primary winding 102 has its center tap 106 connected to reference or ground potential. A capacitor 107, the purpose of which will appear hereinafter, is connected across primary winding 102.

The emitter electrodes 108, 110 of transistors 94, 96 are connected to a common junction 112, and a common emitter resistor 114 is connected between junction 112 and B+. A bleeder resistor network is provided which comprises a resistor 116 connected between emitter resistor 114 and the center-tap 118 of secondary winding 78, and a resistor 120 connected between center-tap 118 and ground.

The relative values of resistance of the emitter resistor 114 and resistors 116, 120 are such that, in the absence of input signals, the emitters 108, 110 are maintained slightly positive with respect to base electrodes 90, 92. Under such conditions, emitter-to-collector current flows through each transistor, and the sum of these currents is the total which will flow in one transistor when the other is non-conducting; however, these currents flow in opposite directions to ground through the respective halves of primary winding 102, thus cancelling each other.

Load resistor 122 will be observed to be in parallel with transistors 94, 96. This load resistor functions to maintain a substantially constant input load impedance. The transistor is a non-linear circuit element, and its input impedance decreases with increasing input signal amplitude. Load resistor 122, for the purpose of this invention, has a resistance much lower than the input impedance of either transistor 94, 96 over a range of input signals limited to the maximum value obtained as heretofore described. This condition is illustrated in Fig. 3, wherein curve 130 represents the impedance curve of a transistor with input signals of different magnitudes, and the resistance of load resistor 122 is indicated at 132. The upper limit of the input signal voltage, $E_{max}$, is fixed by the voltage appearing across secondary winding 78. Since the transistor input impedance and load resistor 122 are in parallel, the total input impedance for input signals below $E_{max}$ is only slightly less than the resistance of the load resistor, and is substantially constant. Curve 134 represents the total input impedance.

It will be apparent, however, that load resistor 122 is not essential to the operation of the system of this invention; operation is entirely satisfactory without it, but such a resistor may be employed where it is desired to have a constant input load impedance for transistors 94, 96.

When square wave signals appear across secondary winding 78, the respective base potential on transistors 94, 96 vary oppositely by equal amounts, the direction of change reversing in succeeding half cycles. This results in increasing the base potential of one transistor by an amount corresponding to the magnitude of the input signal, and similarly lowering the base potential of the other transistor. There is thus a double-ended input for operating the transistors in push-pull. The emitter resistor 114 performs the same function as dropping resistor 86, whereby maximum gain results fo rsignals smaller than that necessary to cut off one transistor. Resistor 114 is approximately the same size as load resistor 122, and relatively small compared to bleeder resistors 116, 120. In a typical example, resistors 114 and 122 of 2,700 ohms, and resistors 116, 120 respectively of 22,000 and 10,000 ohms, were used in a circuit supplied from a 28-volt aircraft battery.

The output of transformer 104 includes two secondary windings 136, 138, each having one end connected to respective base electrodes 140, 142 of transistors 144, 146. The collector electrode 148 of transistor 144 is directly connected to the emitter electrode 150 of transistor 146. The emitter electrode 152 of transistor 144 is connected to B+, and collector electrode 154 of transistor 146 is connected to ground. The other ends of secondary windings 136, 138 are connected respectively to B+ and to the junction 156 between the directly connected collector 148 and emitter 150. Also connected between B+ and junction 156 are a capacitor 160 and resistor 162, the junction 164 of which is connected through a capacitor 166 to lead 22 for applying signals to the control winding of motor 18.

The transistors 144, 146 operate as switches, only one of which is closed at a time, and secondary windings 136, 138 are properly poled to accomplish this result. For example, on the negative half cycle, with the secondary windings poled as indicated in Fig. 1, the base potential of transistor 144 will decrease and the emitter potential will decrease, whereby emitter-to-collector current will flow through transistor 144. At the same time, the potential of emitter electrode 150 of transistor 146 will be made relatively negative with respect to potential of base electrode 142, whereby no current will flow through transistor 146. On the succeeding positive half cycle, these conditions are reversed so that transistor 146 conducts and transistor 144 does not. In this manner, junction 156 will be directly connected to B+ on one half cycle and to zero or ground potential on the succeeding half cycle. Thus, a square wave signal varying between zero and B+ (see Fig. 4) will be applied to capacitor 166. Capacitor 166 removes the D.-C. component in normal fashion, and the net result is that control voltages applied through lead 22 to the control winding of motor 18 will be square waves, the magnitude of the half cycles of which is half the supply voltage.

In a conventional manner, motor 18 operates at a speed determined by the frequency and magnitude of the control signal, and in a direction determined by the phase of the control signal; further, such control signal must be 90° out of phase with the reference signal. In the circuits arrangements above described, resistor 70 is made variable, to provide an adjustment whereby to insure that the control signal can be made to be precisely 90° out of phase with the reference signal. With such adjustment made, the control signal leads the reference signal by 90° when the antenna 12 is clockwise from null, and lags by 90° when the antenna is counter-clockwise from null. For a further understanding of the operation of two-phase motors of the type here employed, reference may be had to U.S. Patent 2,426,497 of W. J. Field, "Amplifying System."

Capacitor 107 prevents undesired high frequency signals entering the system from appearing in the output, whereby the are not amplified and applied to the motor to reduce sensitivity about null. Thus, since the control signals are of the desired fixed frequency and are of constant magnitude, the motor will drive the antenna to null at constant speed.

The above described system arrangement effects automatic positioning of the antenna. To utilize the system for manual control of antenna rotation, and to test the operation of the system, a pair of resistors 170, 172 are connected respectively to the emitters 38, 40 of transistors 30, 32 and respective contacts 174, 176 of a single-pole, double-throw switch 178. The movable contact 180 of switch 178 is connected to a lead 182 which in turn is connected to lead 20. Movable contact 180 is controllable manually to apply the reference signal to one or the other of the emitters 38, 40 of respective transistors 30, 32. If desired, movable contact 180 can be spring-biased in a conventional manner to return to break contact upon being released. Preferably, the magnitude of the reference signal is not greater than the maximum error signal, that is, the error signal representing maximum deviation of antenna 12 from the null. If the antenna is at null when switch 178 is closed against one of its contacts, the reference signal will cause the emitter potential to vary with respect to the base potential, whereby conduction will occur and result in an output signal to operate motor 18 and thereby rotate antenna 12 away from null.

As soon as the antenna rotates from null, error signals are developed and applied from receiver 10 in the manner previously described. If the reference signal is then removed, as by opening switch 178, the automatic control previously described will take effect and the antenna will be returned to null. If the switch 178 remains closed, rotation of the antenna away from null will continue to a point where the input signal is comparable in magnitude to the reference signal, from which point the motor will return the antenna to null when the switch 178 is opened.

It will be apparent from the foregoing that there has been described a small, light weight servo amplifier system employing transistor circuit arrangements cooperatively related in a novel manner to effect highly reliable and positive control of an output device in response to square wave input signals.

The system of this invention has been described as using p-n-p junction transistors. It will be readily apparent that n-p-n junction transistors could also be employed, it being necessary only to reverse applied potentials in a manner well known in the art.

What is claimed is:

1. In combination with a rotatable device having a predetermined position, and a two-phase motor being operable in response to a reference square wave voltage and a control square wave voltage, which are 90° out of phase and are of the same predetermined frequency, to rotate the device from any other position to the predetermined position: means for applying a square wave reference voltage of the predetermined frequency to the motor, means for developing a square wave error signal of the predetermined frequency which represents the position of the device with respect to the predetermined position thereof, first and second and third pairs of transistors, each of said transistors having a base electrode, an emitter electrode and a collector electrode, respective means for biasing the base and emitter electrodes of said first and second transistors for minimum emitter- to collector current flow in the absence of error signal, means to apply the error signal to the base electrode of one of said first pair of transistors, means to prevent the error signal appearing on the base electrode on the other of said first pair of transistors, respective direct current connections between the emitter electrodes of said first and second pairs of transistors, a first signal translating network coupled to the collector electrodes of said first pair of transistors and to the base electrodes of said second pair of transistors, a second signal translating network coupled to the collector electrodes of said second pair of transistors and to the base electrodes of said third pair of transistors, the emitter and collector electrodes of said third pair of transistors being connected with the emitter-to-collector current paths in series between first and second points of D.-C. potential, whereby the emitter of one and the collector of the other of said third pair of transistors are directly connected together and have a common junction, said second signal translating network applying amplified square wave signals in opposite phase to the base electrodes of said third pair of transistors, each transistor of said third pair being non-conductive in the absence of square wave signals on the base electrodes thereof, one transistor of said third pair being conductive and the other being non-conductive during each half cycle of square wave signals applied to the base electrodes thereof, whereby the transistors of said third pair are rendered alternately conducting to vary the voltage at said common junction between said first and second points of D.-C. potential, means to convert the potential variations at said common junction to a square wave control voltage of constant magnitude and to apply said control voltage to the motor, and phase control means associated with at least one of said signal translating networks to cause said control voltage to be applied to the motor 90° out of phase with the reference voltage.

2. The combination defined in claim 1, further including switch means for selectively applying the reference voltage to one or the other emitter electrode of said first pair of transistors.

3. An amplifier system comprising a push-pull input stage having a single-ended input, a push-pull intermediate stage having a double-ended input, and an output switching stage, said input stage including a first pair of transistors each having base, emitter and collector electrodes, a first load impedance connected between said collector electrodes, said base electrodes being resistively connected, said emitter electrodes being resistively connected, means to apply a cyclical input signal to the base electrode of one of said transistors, means to prevent the cyclical input signal from being applied to the base electrode of the other of said transistors, said emitter electrodes having potentials which vary about a predetermined level in response to the cyclical input signal to effect push-pull emitter-to-collector current flow through said transistors to said load impedance, said intermediate stage including a second pair of transistors each having base, emitter and collector electrodes, means coupled to said first load impedance and connected between the base electrodes of said second pair of transistors to apply thereto in opposite phase signals representing the net current flow to said first load impedance, the emitters of said second pair of transistors being directly connected, a second load impedance connected between the collector electrodes of said second pair of transistors, the emitter electrodes of said second pair of transistors having potentials which vary about a predetermined level in response to signals applied to the associated base electrodes to effect push-pull emitter-to-collector current flow through said second pair of transistors to said second load impedance, said output switching stage including a third pair of transistors each having base, emitter and collector electrodes, a direct connection between the emitter electrode of one and the collector electrode of the other of said third pair of transistors, one of the remaining emitter and collector electrodes of said third pair of transistors being connected to a point of second D.-C. potential, means coupled to the base electrodes of said third pair of transistors and responsive to the net current flow to said second load impedance to effect emitter-to-collector current flow alternately through the respective transistors, whereby the voltage at said direct connection varies between said first and second points of D.-C. potential.

4. The combination defined in claim 3, wherein said first load impedance includes an impedance element having two end terminals and a center tap, a resistor and capacitor connected in series between said end terminals, said resistor and capacitor being connected at their junction to the collector electrode of said other of said first pair of transistors and said center tap being connected to the collector electrode of said one of said first pair of transistors, a pair of load resistors having equal values of resistance connected respectively between the collector electrodes of said first pair of transistors and said first point of D.-C. potential, a voltage divider network connected between said first and second points of D.-C. potential, the resistive connection between said base electrodes being connected to said voltage divider network to provide a predetermined D.-C. potential at said base electrodes, an A.-C. bypass capacitor connected between one of the base electrodes of said first pair of transistors and said first point of D.-C. potential, said means for applying the input signal including a capacitor connected to the base electrode of said one of said first pair of transistors, the resistive connection between said emitter electrodes including an unbypassed resistor connected to said second point of D.-C. potential to provide a predetermined D.-C. potential at such emitter electrodes, the resistance of said unbypassed resistor being large compared to the emitter impedance of said first pair of transistors and the respective resistive connections.

5. The combination defined in claim 3, wherein said means for applying signals to the base electrodes of said second pair of transistors includes an impedance element having end terminals and a center tap, said end terminals being connected respectively to the base electrode of said second pair of transistors, a bleeder resistor network connected between said center tap and said second point of D.-C. potential, a resistive element connected between said second point of D.-C. potential and the junction of the emitter electrodes of said second pair of transistors, and said second load impedance including an impedance element having end terminals connected respectively to the collector electrodes of said second pair of transistors, and a center tap for said last-mentioned impedance element connected to said first point of D.-C. potential.

6. A push-pull translating network comprising a pair of power amplification transistors each having a base electrode, an emitter electrode and a collector electrode, a direct connection between said emitter electrodes, a source of D.-C. voltage, a resistor connected between said source and said emitter electrodes to effect a predetermined bias current into said emitter electrodes, a load impedance connected between said collector electrodes, a resistive connection between said base electrodes, means for biasing said base electrodes, the emitter and base electrode biases being proportioned to produce substantially equal collector currents, and means to apply a cyclical input signal to said base electrodes.

7. A switching network for developing a voltage varying between fixed limits comprising first and second transistors each having an emitter electrode, a base electrode and a collector electrode, a source of positive D.-C. voltage, the emitter electrode of said first transistor and the collector electrode of said second transistor being directly connected to a common junction point, the remaining electrode of one of said transistors being coupled to said source and the remaining electrode of the other of said transistors being connected to ground, said transistors being normally non-conductive, means for applying a cyclical signal to said base electrodes, said transistors being rendered alternately conducting by said signal and with respect to each other, thereby to conductively connect said common junction point alternately between ground and said positive D.-C. voltage, and means coupled to said common junction point for utilizing the varying voltage thereof.

8. The combination defined in claim 7, wherein said means for applying the signal to said base electrodes includes an input signal transformer having a primary winding to which the signal is applied and first and second secondary windings, said first secondary winding being connected between the base electrode of one of said transistors and said source, and said second secondary winding being connected between the other base electrode and said common junction point.

References Cited in the file of this patent

UNITED STATES PATENTS

| | | |
|---|---|---|
| 2,426,497 | Field | Aug. 26, 1947 |
| 2,443,347 | Field | June 15, 1948 |
| 2,457,792 | Wild et al. | Dec. 28, 1948 |
| 2,476,849 | Ergen | July 19, 1949 |
| 2,489,637 | Hand | Nov. 29, 1949 |
| 2,594,449 | Kircher | Apr. 29, 1952 |
| 2,698,392 | Herman | Dec. 28, 1954 |
| 2,774,021 | Ehret | Dec. 11, 1956 |
| 2,812,393 | Patrick | Nov. 5, 1957 |
| 2,816,179 | Gittleman et al. | Dec. 10, 1957 |

OTHER REFERENCES

Ahrendt, W. R.: Servomechanism Practice, McGraw-Hill, N.Y., 1954, page 117, Figs. 8–3.